United States Patent [19]
Johnson

[11] 4,019,608
[45] Apr. 26, 1977

[54] LEVER ACTUATED CALIPER BRAKE
[76] Inventor: Norman Allen Johnson, 5325 Tenth Ave., South Delta, B. C., Canada
[22] Filed: May 5, 1975
[21] Appl. No.: 574,609
[52] U.S. Cl. .................... 188/59; 188/72.9; 188/76
[51] Int. Cl.[2] ..................... F16D 55/224
[58] Field of Search ............ 188/73.1, 71.1, 72.6, 188/72.9, 78, 59, 153 A, 235, 236, 71.7, 76

[56] References Cited
UNITED STATES PATENTS

| | | | |
|---|---|---|---|
| 1,711,602 | 5/1929 | Kindler | 188/72.9 |
| 2,236,898 | 4/1941 | Eksergian | 188/59 |
| 2,343,342 | 3/1944 | Tack | 188/59 |
| 2,464,680 | 3/1949 | Gaenssle | 188/153 A |
| 2,686,576 | 8/1954 | Bachman et al. | 188/59 |
| 2,690,237 | 9/1954 | Casey | 188/59 |
| 2,791,294 | 5/1957 | Bachman et al. | 188/59 |
| 2,861,654 | 11/1958 | Dean | 188/59 |
| 3,122,219 | 2/1964 | Altherr | 188/59 |
| 3,189,128 | 6/1965 | Herbert | 188/72.6 |

*Primary Examiner*—Trygve M. Blix
*Assistant Examiner*—Edward R. Kazenske

[57] ABSTRACT

A caliper brake adapted to grip the sides of a clamped member and, more specifically, the sides of solid and ventilated discs such as those used in industrial and automotive applications. The present caliper brake includes a base adapted for mounting on a support which is fixed in relation to a movable clamped member. A pair of levers are pivotally mounted intermediate their ends in base lugs. A linear actuator is operatively mounted on one end of the levers and a pair of shoes having shoe lugs are pivotally mounted at the other. Guide surfaces on the shoe lugs are slidably opposed to guide surfaces on the base lugs such that during movement of the shoes toward each other the shoe brake surfaces are maintained substantially parallel with the sides of the clamped member.

6 Claims, 5 Drawing Figures

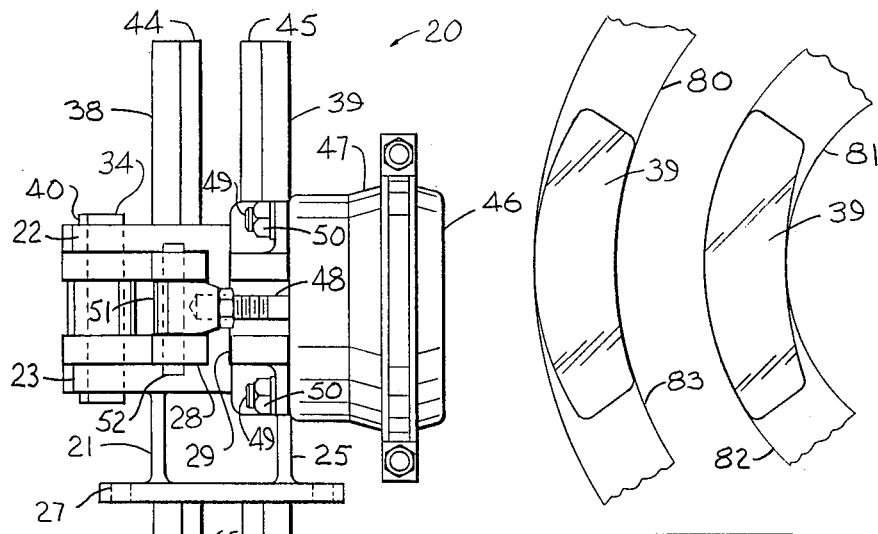
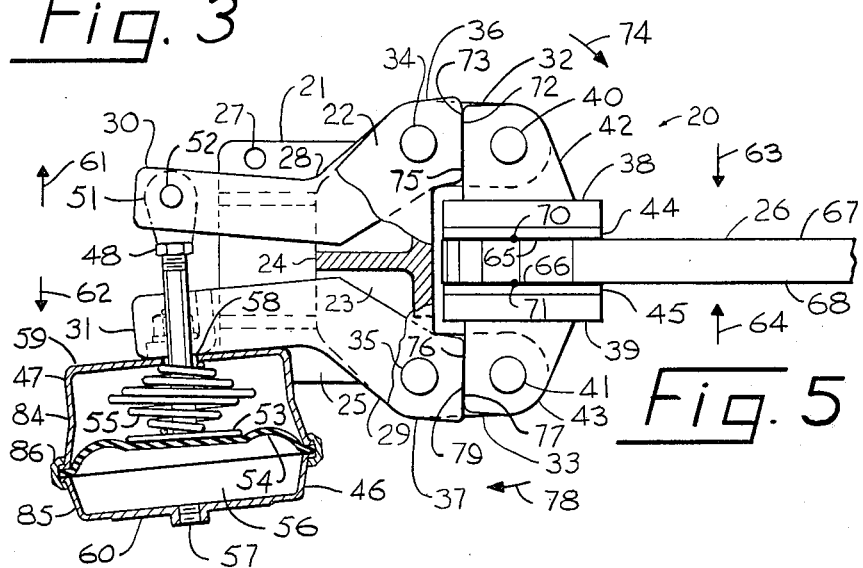

LEVER ACTUATED CALIPER BRAKE

This invention is concerned with novel improvements in devices known in the art to which they pertain as caliper brakes or to devices having the general character of caliper brakes which apply substantially equal and opposite normal forces to opposite sides of a clamped member and are adapted to sustain friction forces in planes substantially perpendicular to those normal forces. Specifically, the present invention is adapted for use in combination with rotatable discs.

A caliper brake adapted for use with rotatable discs should satisfy several requirements. First, the shoe friction surfaces which contact the sides of the disc should be guided whereby to maintain substantially uniform wear of the shoe, especially at the end of the shoe movement and lining life. Second, simple economical means should be provided whereby friction forces on the brake shoes are transferred to the caliper frame or base. Third, components of the caliper assembly should be so arranged as to permit a minimum dimension on one side of the disc whereby the caliper may be installed in close proximity to other fixed or rotating elements located near the disc. Fourth, the caliper assembly should permit as large a shoe surface area as possible, referenced to the size of the disc with which it is combined, without limitation by or interference with the caliper base. Fifth, the shape of the caliper shoe should be adapted to accommodate a range of disc diameters of given face width whereby to provide a range of torque capacity for a given caliper.

Accordingly, one object of this invention is to provide an improved caliper brake in which slidable interaction between elemental surfaces on the brake shoes and the caliper base serves to guide the shoes whereby their brake surfaces are maintained substantially parallel with the opposite sides of a clamped member.

Another object of this invention is to provide an improved caliper brake wherein lever interconnected lugs on the brake shoes and the caliper base not only provide actuation of the brake shoes but also interact slidably whereby to guide the shoes and maintain their friction surfaces substantially parallel with opposite sides of a clamped member throughout movement of those friction surfaces attendant with functional wear thereof.

Yet another object of this invention is to provide an improved caliper brake wherein lever interconnected lugs on the brake shoes and caliper base not only provide actuation of the brake shoes, and slidably interact to guide the shoes in their movement with respect to a clamped member, but also transfer friction forces in the planes of the brake shoes through the lever into the caliper base.

Still another object of this invention is to provide a caliper brake in which lever interconnected lugs on the brake shoes and caliper base not only provide actuation of the shoes, guide the shoes in relation to a clamped member, and transfer friction forces to a caliper base, but also permit a shoe configuration whose size and shape is not restricted by the lever and caliper configuration.

Yet another object of this invention is to provide an improved caliper brake in combination with a rotatable disc wherein lever interconnected lugs on the brake shoes and caliper base permit a brake shoe shape adapted to a range of disc diameters of a given face width, the convex arcuate edge of the shoe being substantially coincident with the outer face circumference of the smallest disc and the concave arcuate edge being substantially coincident with the inner face circumference of the largest disc in the range.

A further object of this invention is to provide an improved lever actuated caliper brake in which a simplified linear actuator is secured to one of a pair of levers and pivotally interconnected to the other of the levers whereby the substantial mass of the actuator is situate at one side of the clamped member.

These and still further objects and advantages of the present invention reside in the details of construction of a preferred embodiment disclosed herein and will be evident to one skilled in the art from a study of the specification and accompanying drawings. Therefore, the preferred embodiment disclosed is merely exemplary and is not intended to detract from the full scope of the invention as set out in the annexed claims.

In the drawings, wherein like numerals refer to like parts:

FIG. 3 is an elevation view of a lever actuated caliper brake taken substantially along line 3—3 in FIG. 1;

FIG. 4 illustrates a caliper brake shoe of given shape adapted to fit a range of concentric discs of given face width;

FIG. 5 is a partial sectional view of a lever actuated caliper brake taken substantially along line 5—5 in FIG. 2.

Figure 1:
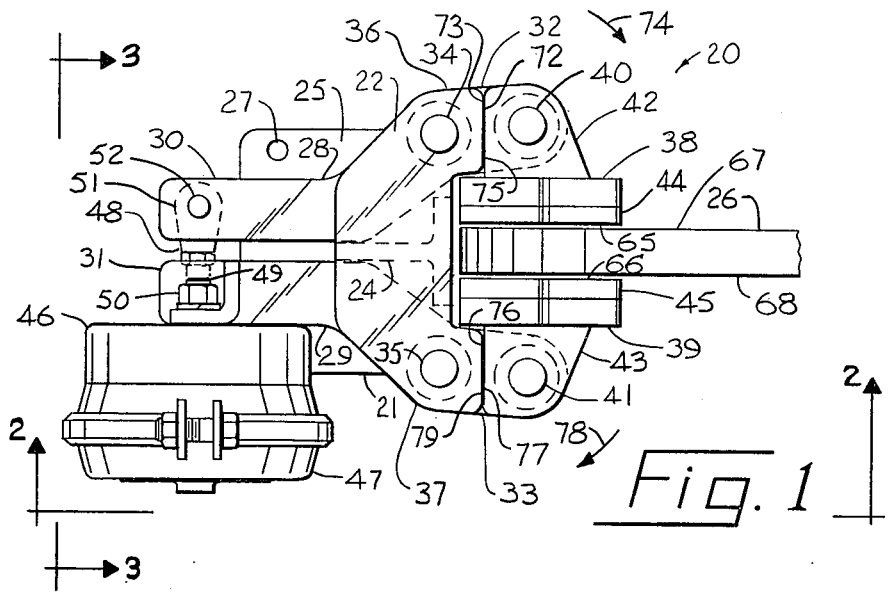
FIG. 1 is a plan view of a lever actuated caliper brake in accordance with the present invention taken substantially in the plane of a clamped member.
Figure 2:
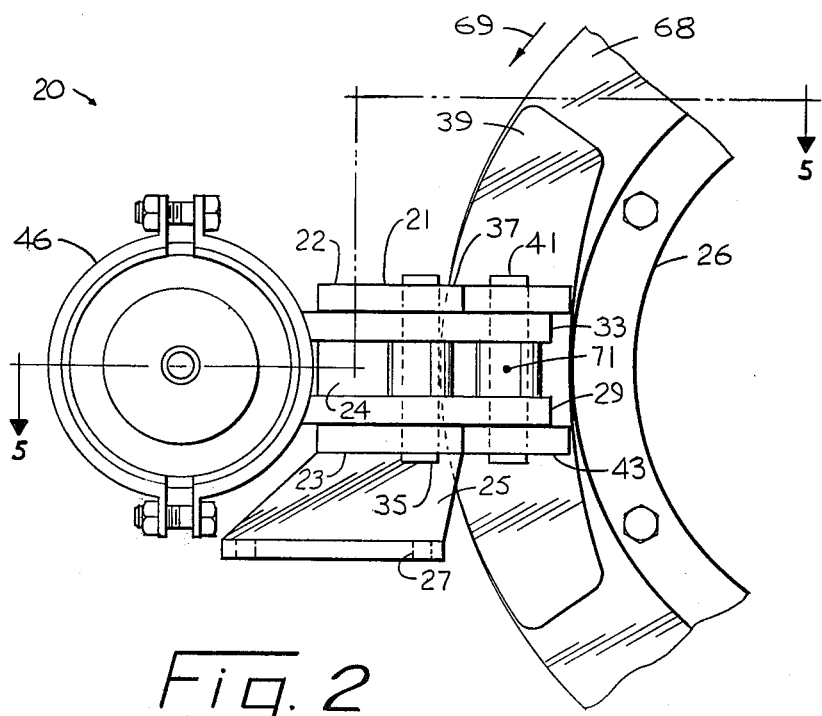
FIG. 2 is a side view of a lever actuated caliper brake taken substantially along line 2—2 in FIG. 1.

Referring now to the drawings, FIGS. 1 and 2 illustrate the general structure of a preferred embodiment of a lever actuated caliper brake 20 in accordance with the present invention. Caliper base means 21, comprising a pair of lever bracket means 22 and 23 secured to spreader section 24 and mounting bracket 25, is secured to a frame (not shown) fixed in relation to clamped member 26 by means of holes 27. A pair of lever means 28 and 29, having actuated ends 30 and 31 and actuating ends 32 and 33, are pivotally mounted intermediate their ends by pin means 34 and 35 in base lug means 36 and 37 integral to each of lever bracket means 22 and 23. A pair of brake shoe means 38 and 39 are pivotally mounted on lever actuating ends 32 and 33 respectively by pin means 40 and 41 in shoe lug means 42 and 43. It will be evident to one skilled in these arts that pins 34, 35, 40 and 41 may be secured axially by a variety of means, one of the simplest being cotter pins. Further, it will also be evident that shoes 38 and 39 normally are lined with a friction material 44 and 45, attached either with bonding compound or rivets, and adapted to wear in preference to clamped member 26.

Operatively interconnected to actuated ends 30 and 31 of levers 28 and 29 is linear actuator means 46 comprising body portion 47 and rod portion 48. Body portion 47 is secured at rod end 59 to lever 31 by stud bolts 49 and nuts 50. Rod portion 48 includes socket means 51 pivotally mounted in lever end 30 by pin 52. With reference to FIG. 5, in the case of a fluid actuated linear actuator, rod 48 also includes base piston 53 impelled against diaphragm 54 by return spring 55. Diaphragm 54 is secured between portion 84 and 85 of body 47 by clamping means 86. Fluid entering chamber 56 by means of port 47 impels lever ends 30 and 31 apart and, hence, shoes 38 and 39 together against member 26. Oversize hole 58 permits rod 48 and piston 53 to swivel or pivot slightly on diaphragm 54 to accommodate relative angular movement of lever 28 with respect to lever 29 without binding; it will be apparent that rod end 59 of body 47 might be pivotally mounted on lever 29 in the event that rod 48 and piston 53 are close fitting in body 47. In addition, it will be apparent that actuator 46 might be installed in like manner between lever ends 30 and 31, whereby body end 60 is either operatively secured or pivotally mounted on one of the lever ends. Furthermore, it will be clear that actuator 46 might be electrically or spring actuated instead of fluid actuated.

From FIGS. 1 and 2 it is evident that actuator forces applied to levers 28 and 29 in directions 61 and 62 by actuator 46 cause shoes 38 and 39 to move in direction 63 and 64. When shoe surfaces 65 and 66 contact sides 67 and 68 of clamped member 26, a disc in the case illustrated, a normal force is applied to shoes 38 and 39 in directions respectively opposite 63 and 64. If disc 26 were rotating in direction 69, a friction force would be generated in the plane of each of surfaces 65 and 66 in a direction substantially tangent to the arcuate path described by single points on the opposite sides of disc 26 passing through the centroidal pressure centers 70 and 71 of surfaces 65 and 66. The friction forces on surfaces 65 and 66 are transferred through lugs 42 and 43 into levers 28 and 29 and, thence, into lugs 36 and 37. Therefore, whereas lugs 42, 43, 36, and 37 serve to provide the lever actuated normal forces in shoes 38 and 39, they also provide means whereby friction forces substantially perpendicular to those normal forces are transferred from shoes 38 and 39 to caliper base means 21.

It will be noted in FIG. 1 that the distance between the pivotal axes of pins 40 and 41 is variable whereas that between the pivotal axes of pins 34 and 35 is substantially fixed. When shoes 38 and 39 are in their retracted or de-actuated positions, the distance between the axes of pins 40 and 41 is greater than that between the axes of pins 34 and 35. Conversely, FIG. 5 indicates that when shoes 38 and 39 are in their fully actuated position, subsequent to wear of friction material linings 44 and 45, the distance between the axes of pins 40 and 41 will be less than that between the axes of pins 34 and 35. This axis geometry of pins 40, 41, 34, and provides that the clearance between base guide surface 72 and shoe guide surface 73 respectively of lugs 36 and 42 is a minimum at the beginning and end of the total travel of shoe 38 while it reaches a maximum when the distance between the axes of pins 40 and 41 is essentially the same as that between the axes of pins 34 and 35. In this way, slidable interaction between lugs 42 and guide shoe 38 in a manner whereby brake shoe surface 38 is maintained substantially parallel to the face of disc 26, throughout the total travel of shoe 38 and particularly at the end of the travel where friction material 44 has achieved its maximum wear potential and minimum thickness. In like manner, shoe 39 is guided by lugs 37 and 43. Hence, lugs 36, 37, 42, and 43 not only provide lever actuation of shoes 38 and 39 and transfer friction forces to base 21, but they also guide the shoes with respect to clamped surfaces of disc 26.

With reference to FIGS. 1 and 5, and considering the brake 20 in its actuated mode, it will be apparent that if the centroidal pressure center 70 of shoe 38 is closer to base 21 than the pivotal axis of pin 40, then a moment will be generated in shoe 38 in direction 74. Clearly, lug 42 will contact lug 36 inboard of the axes of pins 34 and 40, in the vicinity indicated by the numeral 75, whereby a counter-moment to that in direction 74 is provided to shoe 38. In this case, shoe guide surface 73 of lug 42 should be substantially perpendicular to disc surface 68 whereas base guide surface 72 may be relieved outboard of contact area 75. On the other hand, if the pivotal axis of pin 41 is closer to base 21 than centroidal pressure center 71, then a moment will be generated in shoe 39 in direction 78. Lug 43 will contact lug 37 outboard of the axes of pins 35 and 41, in the vicinity indicated by the numeral 79, whereby a counter-moment to that in direction 78 is provided to shoe 39. In this case, base guide surface 77 of lug 37 should be substantially perpendicular to disc surface 68 whereas shoe guide surface 76 may be relieved inboard of region 79. Hence, the desired shape and geometry of surfaces 72, 73, 76 and 77 are dependent upon the relationship between the location of centroidal pressure center 71 of shoe 39 with respect to the pivotal axis of pin 41; the same applies to pressure center 70 of shoe 38 and surfaces 72 and 73. The relationship obtained in each case will be a matter of design depending upon the desired physical geometry of my invention as required by specific circumstances.

FIG. 4 illustrates portions 80 and 81 of a pair of concentric discs representing the largest and smallest of a range of discs of the same face width. The convex arcuate edge 87 of shoe 39 is of substantially the same radius as the face outer circumference 82 of disc 81 whereas the concave arcuate edge 88 of shoe 39 is of substantially the same radius as the face inner circumference 83 of disc 80. In this way, a shoe of standard shape and size, being part of a caliper brake of standard holding and energy dissipating capacity, is adapted to a range of disc diameters of the same face width.

It is believed that my invention of a lever actuated caliper brake will have been clearly understood form the foregoing detailed description of my now preferred and illustrated embodiment. Various modifications, changes, additions, and equivalents may be resorted to in view of these teachings by one skilled in this art without departing from the spirit of my invention. Therefore, the present invention is not to be construed as limited to the specific details illustrated and described above, and whereas a choice between variations, modifications, changes, additions and equivalents falling within the true scope of my invention will depend largely upon the circumstances in which it is used, it is my express intention that no limitations be implied and that the hereto annexed claims be given the broadest interpretation to which the language fairly admits.

The embodiments of the invention in which an exclusive property or privilege is claimed are defined as follows:

1. A lever actuated caliper brake, in combination with a clamped member having a pair of clamped surfaces, comprising a base means having integral base lug means, said base lug means having only a single planar guide surface substantially perpendicular to said clamped surfaces of said clamped member, a pair of lever means each having an actuated end and an actuating end, each of said lever means pivotally mounted in said base lug means intermediate said actuated and actuating ends, a pair of brake shoe means each having a braking surface on one side thereof and integral shoe lug means extending outwardly from the other side thereof, said shoe lug means having only a single planar guide surface substantially perpendicular to said clamped surfaces of said clamped member and said guide surface of said shoe lug means being in abutting relation to said guide surface of said base lug means, said actuating end of each of said pair of lever means pivotally mounted in said shoe lug means of one of said pair of brake shoe means, said shoe lug means and said base lug means guide surfaces being in slidable opposed ralation, actuator means operatively interconnected to said actuated ends of said pair of lever means, whereby actuation of said actuator means causes said brake shoe means to move toward each other and slidable contact between said guide surfaces of said shoe lug means and said base lug means maintains each of said braking surfaces in substantially parallel relation with one of said pair of clamped surfaces.

2. A lever actuated caliper brake as defined in claim 1, wherein each of said braking surfaces has a centroidal pressure center, the pivotal axis on which said actuating end of one of said lever means is mounted in said shoe lug means being substantially offset from a line passing through said centroidal pressure center and perpendicular to said braking surface in a direction toward said base means, said guide surface of said shoe lug means in said opposed slidable contact with said guide surface of said base lug mans on the side of said pivotal axis opposite said braking surface.

3. A lever actuated caliper brake as defined in claim 1, wherein each of said braking surfaces has a centroidal pressure center, the pivotal axis on which said actuating end of one of said lever means is mounted in said shoe lug means being substantially offset from a line passing through said centroidal pressure center and perpendicular to said braking surface in a direction away from said base means, said guide surface of said base lug means in opposed slidable contact with said guide surface of said shoe lug means on the same side of said pivotal axis as said braking surface.

4. A lever actuated caliper brake as defined in claim 1, wherein said base lug means and said lever means have first opposed surfaces in a plane substantially perpendicular to the axis on which said lever means is pivotally mounted in said base lug means, said lever means and said brake shoe lug means having second opposed surfaces in a plane substantially perpendicular to the axis on which said lever means is pivotally mounted in said shoe lug means, whereby brake forces in the planes of said braking surfaces are transmitted through said second opposed surfaces to said lever means and said first opposing surfaces to said base means.

5. A lever actuated caliper brake as defined in claim 1, wherein said actuator means effects a total shoe travel at each of said brake shoe means between fully retracted and fully actuated shoe positions, the distance in said fully retracted position between the pivotal axes on which said lever means is mounted in said shoe lug means being substantially equal to the distance between the pivotal axes on which said lever means are mounted in said base lug means plus one half of said total shoe travel of both of said brake shoe means.

6. A lever actuated caliper brake in combination with a clamped member having clamped sides, comprising a base means having two pairs of integral base lugs, each of said base lugs having only a single planar guide surface substantially perpendicular to said clamped sides of said clamp member, a pair of levers each having an actuated end and an actuating end, each of said levers pivotally mounted between one pair of said base lugs intermediate said actuated end and said actuating end, a pair of brake shoes each having a braking surface on one side thereof and a pair of integral shoe lugs extending outwardly from the other side thereof, each of said shoe lugs having only a single guide surface substantially perpendicular to said clamped sides of said clamped member and said guide surface of each said shoe lug being in respectively abutting relation to said guide surface of each said base lug said actuating end of each of said pair of levers pivotally mounted between said pair of shoe lugs of one of said pair of brake shoes, each said shoe lug and said base lug guide surface being in respective slidable opposed relationship, linear actuator means operatively interconnected to said actuated ends of said pair of lever means, each of said levers mounted on said base lugs and said shoe lugs for pivotal contact therebetween in planes substantially perpendicular to the axes on which they pivot, whereby actuation of said linear actuator means causes said brake shoes to move toward each other and slidable contact between said guide surfaces of said shoe lugs and said base lugs maintains said braking surfaces in substantially parallel relation with said clamped sides.

* * * * *